United States Patent [19]

Chaloner-Gill et al.

[11] Patent Number: 5,354,631

[45] Date of Patent: Oct. 11, 1994

[54] ENHANCED LITHIUM SURFACE

[75] Inventors: Benjamin Chaloner-Gill, Santa Clara; On K. Chang, San Jose; Neal Golovin, San Jose; Eileen Saidi, San Jose, all of Calif.

[73] Assignee: Valence Technology, Inc., San Jose, Calif.

[21] Appl. No.: 73,409

[22] Filed: Jun. 8, 1993

[51] Int. Cl.$^5$ .................................... H01M 10/40
[52] U.S. Cl. .................................. 429/137; 429/215; 427/58; 427/388.1; 29/623.5
[58] Field of Search ................ 429/48, 137, 215; 427/58, 388.1; 29/623.5

[56] References Cited

U.S. PATENT DOCUMENTS

| | | | |
|---|---|---|---|
| 3,983,265 | 9/1976 | Letoffe | 427/58 |
| 4,278,741 | 7/1981 | Kalnoki-Kis | 429/48 X |
| 4,608,753 | 9/1986 | Fleischer | 429/48 X |
| 4,611,040 | 9/1986 | Olson et al. | 427/388.1 X |
| 4,645,846 | 2/1987 | DePasquale et al. | 427/388.1 X |
| 4,999,397 | 3/1991 | Weiss et al. | 427/58 X |
| 5,037,712 | 8/1991 | Shackle et al. | 429/192 |
| 5,166,008 | 11/1992 | Tomida et al. | 429/137 |

FOREIGN PATENT DOCUMENTS

WO93/11571 6/1993 PCT Int'l Appl. .

OTHER PUBLICATIONS

Fiona M. Gray, "Solid Polymer Electrolytes", VCH Publishers, Inc., New York, 1991, pp. 95–123 and 215–237. (month unknown).

*Primary Examiner*—Stephen Kalafut
*Attorney, Agent, or Firm*—Robert E. Krebs

[57] ABSTRACT

This invention is directed to an enhanced lithium surface particularly suited for use as the anode in solid electrochemical cells, which is coated with a polymer of an acryloyl-derivatized alkoxyhalosilane.

27 Claims, No Drawings

ENHANCED LITHIUM SURFACE

FIELD OF THE INVENTION

This invention is directed to a stable, more useful form of lithium, lithium alloys and substrates coated with lithium. Lithium, one of the most reactive elements of the periodic table, forms passivation layers on exposed lithium metal surfaces. Typically, such passivation layers are composed of lithium oxide, lithium hydroxide or lithium carbonate under conditions of interest in the fabrication of solid lithium electrochemical cells. This invention is directed to enhancing the surface of lithium metal by creating an artificial passivating layer of polymeric design. The enhanced lithium surface finds use in the fabrication of improved electrochemical cells and batteries made from lithium electrodes.

BACKGROUND OF THE INVENTION

Electrochemical cells containing an anode, a cathode and a solid, solvent-containing electrolyte are known in the art and are usually referred to as "solid batteries". These cells offer a number of advantages, including improved safety features. Notwithstanding their advantages, the use of certain of these solid batteries over repeated charge/discharge cycles may be substantially impaired when they exhibit significant drops in their charge and discharge capacity over repeated cycles as compared to their initial charge and discharge capacity.

Specifically, solid batteries employ a solid electrolyte interposed between a cathode and an anode. The solid electrolyte contains either an inorganic or an organic matrix as well as a suitable inorganic ion salt. The inorganic matrix may be non-polymeric [e.g., $\beta$-alumina, silicon dioxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic constituents include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where $R'$ is hydrogen or lower alkyl of from 1–6 carbon atoms.

Because of their expense and difficulty in forming into a variety of shapes, inorganic non-polymeric matrices are generally not preferred and the art typically employs a solid electrolyte containing a polymeric matrix. Nevertheless, electrochemical cells containing a solid electrolyte, i.e. a polymeric matrix may suffer from low ion conductivity and, accordingly, in order to maximize the conductivity of these materials, the matrix is generally constructed into a very thin film, i.e., on the order of about 25 to about 250 $\mu$m. As is apparent, the reduced thickness of the film reduces the total amount of internal resistance within the electrolyte thereby minimizing losses in conductivity due to internal resistance.

The solid electrolytes also contain a solvent (plasticizer) which is typically added to the matrix in order to enhance the solubility of the inorganic ion salt in the solid electrolyte and thereby increase the conductivity of the electrochemical cell.

Suitable solvents, well known in the art for use in such solid electrolytes include, by way of example, propylene carbonate, ethylene carbonate, $\gamma$-butyrolactone, tetrahydrofuran, glyme (dimethoxyethane), diglyme, triglyme, tetraglyme, dimethylsulfoxide, dioxolane, sulfolane and the like.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent (i.e., triglyme and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrochemical cell).

Notwithstanding the above, the initial capacity of solid batteries is often less than desirable. Moreover, even when the initial capacity of the solid battery is relatively high, such solid batteries often exhibit rapid decline in capacity over their cycle life.

Specifically, the cumulative capacity of a solid battery is the summation of the capacity of a solid battery over each cycle (charge and discharge) in a specified cycle life. Solid batteries having a high initial capacity but which rapidly lose capacity over the cycle life will have low cumulative capacity which interferes with the effectiveness of these batteries for repeated use.

The normal passivation layer of lithium surfaces in contact with the described electrolytes are relatively brittle and unstable. When the battery is cycled, the lithium is stripped from the anode on the discharge half-cycle, and is plated on the anode in the recharge half-cycle. The weak passivation layer is disrupted by the cyclic process and the lithium metal reacts further with the electrolyte. Consequently, the lithium is stripped and plated selectively over the anode surface, causing the growth of dendrites, or nodules, which can eventually short the cell through the electrolyte.

It would be advantageous if the lithium surface could be enhanced by a strong and stable passivation layer which is ionically conductive.

SUMMARY OF THE INVENTION

The present invention is directed, in part, to the discovery that an enhanced lithium surface can be obtained by treating the surface of the metal with a polymer precursor composition comprising the di- or monoacrylated alkoxyhalosilane represented by Formula I:

Wherein n is an integer between 3 and 10;

p is an integer 1 or 2;
q is an integer between 0 and 2;
m is an integer between 1 and 3;
with the proviso that p+q+m=4;
$R^1$ is H, or $C_1-C_3$ alkyl;
$R^2$ is H, $C_1-C_6$ alkyl, $C_1-C_6$ alkoxy, or cyclohexyl; and
X is halogen.

In another aspect of the invention a lithium or lithium alloy metal suitable for use, for example as an anode in an electrochemical cell, is one wherein a surface of said metal is coated with a polymer of the di- or monoacrylated alkoxyhalosilane represented by Formula I.

In yet another aspect of the invention a solid electrochemical cell comprises:
  an anode containing lithium;
  a cathode containing a compatible cathodic material; interposed between the anode and the cathode, a solid electrolyte; and interposed between the anode and the electrolyte, a polymeric layer, comprising as prepolymer, the silane represented by Formula I.

In yet another aspect of the invention a method of making an anode for solid electrochemical cells comprises the steps of: coating a lithium or lithium alloy metal surface with a polymer precursor opposition comprising the silane represented by Formula I; and partially or totally curing the polymer precursor.

In yet another aspect of the present invention, a method of making a solid electrochemical cell comprises the steps of: coating a compatible cathode composition comprising a radiation polymerizable polymer precursor onto a substrate; coating an ionically conducting electrolyte composition comprising radiation polymerizable polymer precursors onto the cathode composition; partially or totally curing the cathode composition and the electrolyte composition by exposing same to radiation; coating a lithium, a lithium alloy, or a lithium coated foil metal surface with a polymeric precursor composition comprising the silane represented by Formula I; partially or totally curing said polymer precursor by exposing same to radiation to form a partially or totally cured polymer layer; and placing the partially or totally cured polymer layer in operational contact with the electrolyte composition.

In yet another aspect of the present invention, we have discovered a method of passivating a lithium or lithium alloy metal surface by treating the surface with a composition of polymer precursors comprising the silane represented by Formula I, and curing said polymer precursors to form an ultra thin polymeric layer of submicron thickness.

Among the parameters which define the di- or monoacrylated alkoxyhalosilane represented by Formula I, it is preferred that n have a value of between 5–8. Independent of other preferences, it is preferred that p have a value of 1. Independent of other preferences, it is preferred that m have a value of 1 or 2, and a value of 1 is most preferred. It is also preferred, independent of other preferences that $R^1$ is hydrogen. Independently, $R^2$ is preferably methyl. And finally, it is independently preferred that X is chlorine.

The preferred metal suitable for use as an anode is lithium.

While curing may be carried out by heat, ultraviolet radiation, or electron beam, it is preferred to carry out the curing step by ultraviolet or electron beam.

DETAILED DESCRIPTION OF THE PREFERRED EMBODIMENTS

This invention is directed to an enhanced lithium surface finding use within the field of solid electrochemical batteries having enhanced capacity and prolonged cycle life. However, prior to describing this invention in further detail, the following terms will first be defined.

Definitions

As used herein, the following terms have the following meanings.

The term "solid polymeric matrix" refers to an electrolyte compatible material formed by polymerizing an inorganic or organic monomer (or partial polymers thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silicon dioxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt and a solvent mixture of an organic carbonate and a glyme to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds can form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992 now U.S. Pat. No. 5,262,253 entitled "SOLID ELECTROLYTES DERIVED BY POLYMERIZATION OF VINYL SULFONATE POLYALKYLENE OXIDES" which application is incorporated herein by reference in its entirety), and the like as well as mixtures thereof.

Examples of suitable inorganic solid matrix forming monomers include, by way of example, phosphazenes and siloxanes. Phosphazene monomers and the resulting polyphosphazene solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent mixture of an organic carbonate and a triglyme compound, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one hetero atom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the inorganic ion salt and the organic carbonate/glyme solvent. For example, a composition comprising requisite amounts of the solid matrix forming monomer, inorganic ion salt and organic carbonate/glyme solvent can be applied to a substrate and then cured. Alternatively, the solid matrix forming monomer can be first cured and then dissolved into a suitable volatile solvent. Requisite amounts of the inorganic ion salt and organic carbonate/glyme solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. The particular inorganic ion salt employed is not critical and examples of suitable inorganic ion salts include, by way of example, $LiClO_4$, $LiI$, $LiSCN$, $LiBF_4$, $LiAsF_6$, $LiCF_3SO_3$, $LiPF_6$, $NaI$ and $NaSCN$ and the like. The inorganic ion salt preferably contains at least one atom selected from the group consisting of Li, and Na.

The term "organic carbonate" refers to hydrocarbyl carbonate compounds of no more than about 12 carbon atoms and which do not contain any hydroxyl groups. Preferably, the organic carbonate is a cyclic or an aliphatic carbonate.

The term "electrochemical cell" or "electrolytic cell" refers to a composite containing an anode, a cathode and an ion-conducting electrolyte interposed therebetween.

The Enhanced Anode

The anode is the electrode which undergoes oxidation during the discharge cycle.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, zinc, and the like.

In the present invention, the anodic material containing lithium metal is improved by the addition of the polymeric layer. The layer can be said to function as an artificial passivation layer. The layer is designed to provide longer lithium surface usefulness by means of a flexible stable polymeric coating.

The polymeric coating is a polymerized silane, in particular, a silane which has been acryloyl-derivatized in order to provide adequate polymerization monomers. The silane may be di-derivatized with two acryloyl groups per silicon atom, but it is preferably mono acrylated. The di-acryloyl groups per silicon atom provide an additional advantage of cross-linking between polymers.

Examples of the silane monomers finding use within the scope of the present invention include methacrylalkoxylated trichlorosilane, methacrylalkoxylated chloromethylsilane, acrylalkoxylated dichloroethylsilane, acrlyalkoxylated chlorodimethylsilane, acrylethoxylated dichloromethylsilane, acrylpropoxylated chlorodiethylsilane, acrylbutoxylated dihaloalkylsilane, acryloxyethylated chlorodimethylsilane, acryloxypropylated dichloroalkoxysilane, acrylated propoxychloropropoxysilane, acrylated ethoxychloromethoxysilane, acryloyl-derivatized alkoxychloroalkylsilane, acryloyl-derivatized butoxydibromethoxysilane, acryloyl-derivatized monoalkyleneoxide alkylhalosilane, di-acryloyl-derivatized alkylhalosilane, acryloyl-derivatized alkyleneoxyalkoxyhalosilane.

According to methods which are well known in the art, the acryloyl-derivatization of alkoxylated halosilanes is carried out by the reaction of acrylic acid with alkoxylated halosilane. Alkoxylated halosilanes, for their part, are produced by the reaction of an alkoxide, i.e. an alkyleneoxide with silane, according to methods well known in the art. The methods of polymerizing the silane monomers after treatment of the lithium surface is the same as the well known methodology used to initiate polymerization of acrylates under the influence of ultraviolet radiation, electron beams radiation, or even by the use of heat. The polymerization is carried out by chemical radicals. Depending upon the nature of the polymerization, i.e. thermal, UV or electron beam activated, an initiator may or may not be required.

Other ethylenically unsaturated monomers or oligomers compatible with the silanes of the present invention may be used as copolymer precursors in the polymerization reaction by the addition of such materials to the polymer precursor composition. Examples of such comonomers finding use within the scope of the present invention are disclosed in U.S. Pat. No. 4,830,939. The disclosure of which is incorporated herein in its entirety. Radiation polymerizable polymer precursors useful within the scope of the present invention are also disclosed in U.S. Pat. No. 5,037,712. The disclosure of which is incorporated herein by reference, in its entirety.

The acryloyl-derivatized alkoxyhalosilane of Formula I reacts readily with the lithium surface because the surface is covered with a passivation layer comprising LiOH. The halosilane, preferably a mono or dichlorosilane, most preferably a monochlorosilane, is believed to react readily with the surface to form what is believed to be a Li-O-Si bond, or the equivalent. Whatever the mechanism of reaction, the silane coats the surface of lithium metal with a layer of polymer precursor. The reaction is spontaneous and the reaction conditions are well known in the art. It is preferred that a solution of the silane in a volatile solvent such as anhydrous tetrahydrofuran be used to coat the surface with the polymer precursor. The solution may contain from 1 to 75% by weight of the acryloyl-derivatized silane.

The polymerization reaction (curing) which creates the desired polymeric surface on the lithium metal may be carried out as heretofore described with the acryloyl-derivatized polymer precursors in the electrolyte polymer matrix. As an additional improvement, the polymerization may be carried out with other comonomers in addition to the acryloyl-derivatized silane. For example, the compatible unsaturated monomers previously disclosed for the production of a suitable solid organic matrix may be copolymerized with the acryloyl-derivatized silane after the silane has coated the lithium surface. The use of di-acrylated silane also presents the opportunity for cross-linking of copolymers, and for cross-linking of the polymeric silane layer into the electrolyte layer for even greater stability. To this end, the disclosures of the aforementioned U.S. patents are referred to.

In general, the polymers forming the polyacrylated silane of the present invention have a molecular weight in the range of from about 500 to about 100,000, but the possibility of cross-linking between polymers makes the use of a molecular weight less relevant.

The curing process has been heretofore described. The polymer forms and ultrathin layer on the lithium metal of micron to submicron thickness.

The Electrochemical Cell

The cathode is the electrode which undergoes reduction during the discharge cycle.

The cathode is typically comprised of a compatible cathodic material (i.e., insertion compounds) which is any material which functions as a positive pole in a solid electrolytic cell. Such compatible cathodic materials are well known in the art and include, by way of example, manganese oxides, molybdenum oxides, vanadium pentaoxide, sulfides of titanium and niobium, chromium oxide, lithiated cobalt, manganese oxide, nickel oxide, copper oxide, $V_6O_{13}$ and the like. The particular compatible cathodic material employed is not critical.

In one preferred embodiment, the compatible cathodic material is mixed with an electroconductive material including, by way of example, graphite, powdered carbon, powdered nickel, metal particles, and conductive polymers and a binder such as poly(tetrafluoroethylene) to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent and from at least about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

Methodology

The solid, solvent-containing electrolyte is preferably prepared by combining a solid matrix forming monomer with an inorganic ion salt and the solvent mixture. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu$m). Preferably, the solid, solvent-containing electrolyte has a thickness of from about 25 to about 250 microns, more preferably from about 50 to about 150 microns, and even more preferably from about 80–100 microns.

The electrolyte composition typically comprises from about 5 to about 25 weight percent of an inorganic ion salt based on the total weight of the electrolyte; preferably, from about 10 to 20 weight percent.

The electrolyte composition typically comprises from about 40 to about 80 weight percent solvent (i.e., organic carbonate/glyme mixture) based on the total weight of the electrolyte; preferably from about 60 to about 80 weight percent; and even more preferably about 70 weight percent.

The solid electrolyte composition typically comprises from about 5 to about 30 weight percent of the solid polymeric matrix based on the total weight of the electrolyte; preferably from about 10 to about 20 weight percent; and even more preferably about 17 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, diisopropyl peroxycarbonate, and the like). When curing is by UV radiation, the initiator is typically benzophenone, Darocur ® 1173 (Ciba Geigy, Ardlesy, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a solid matrix forming monomer) can be dissolved into a suitable volatile solvent and the requisite amounts of the inorganic ion salt and solvent are then added. The mixture is then applied onto a suitable substrate (e.g., the surface of the cathode opposite to the current collector) in the manner set forth above and the volatile solvent removed by conventional techniques to provide for a solid electrolyte. Suitable volatile solvents preferably have a boiling point of less than 85° C. and more preferably between about 45° and 85° C. Particularly preferred volatile solvents are a protic solvents. Examples of suitable volatile solvents include acetonitrile, tetrahydrofuran, and the like. However, acetonitrile is not preferred if it is to contact the anode.

In either case, the resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di- and polyacrylate monomers as well as in the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, an inorganic ion salt and the solvent mixture of an organic carbonate and a glyme compound. The composition is then cured to provide for a solid electrolyte on the cathodic surface. The treated and cured anode (e.g., a lithium foil) is then laminated to this composite product in such a way that the solid electrolyte is interposed between the lithium foil's treated surface and the cathodic material.

This process can be reversed so that the treated surface of an anode is coated with a composition comprising a solid matrix forming monomer, an inorganic ion salt and the solvent mixture of an organic carbonate and a glyme compound. The composition is then cured to provide for a solid electrolyte on the polymer-coated anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

EXAMPLE

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

- 84.4 weight percent of carbon powder (Shawinigan Black ™—available from Chevron Chemical Company, San Ramon, Calif.)
- 337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)
- 578.0 weight percent of isopropanol The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^4$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black TM —available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black TM). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black TM). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 4° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns ($\mu$m) with a conventional plate and roller system and is cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C. in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the LiPF$_6$ salt very slowly making sure that the maximum temperature does not exceed 55° C.

8. After the final addition of the LiPF$_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C. The lithium foil surface is enhanced as heretofore described.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the skilled artisan will appreciate the various modifications, substitutions, omissions and changes which may be made without departing from the spirit hereof. The descriptions of the subject matter in this disclosure are illustrative of the invention and are not intended to be construed as limitations upon the scope of the invention.

What is claimed is:

1. A lithium or lithium alloy anode in an electrochemical cell:
wherein a surface of said anode has been treated with a polymer precursor composition comprising the di- or monoacrylated alkoxyhalosilane represented by Formula I:

$$I[CH_2=CR^1C(O)O(CH_2)_nO]_pSi(R^2)_qX_m$$

wherein n is an integer between 3 and 10;
p is an integer 1 or 2;
q is an integer between 0 and 2;
m is an integer between 1 and 3;
with the proviso that p+q+m=4;
$R^1$ is H, C$_1$-C$_3$ alkyl;
$R^2$ is H, C$_1$-C$_6$ alkyl, cyclohexyl or C$_1$-C$_6$ alkoxy; and
X is halogen.

2. An anode according to claim 1 which is lithium.

3. An anode according to claim 1 wherein said polymer precursor is a monoacrylated alkoxyhalosilane.

4. An anode according to claim 1 wherein p=1, m is an integer 1 or 2, and X is chlorine.

5. An anode according to claim 4 wherein n is an integer between 2 and 4, m=1, $R^1$ is H or CH$_3$, and $R^2$ is C$_1$-C$_2$ alkyl.

6. An anode according to claim 1 treated with monoacrylated alkoxychlorodimethylsilane.

7. An anode according to claim 1 treated with diacrylated alkoxychloromethylsilane.

8. A lithium or lithium alloy anode in an electrochemical cell:
wherein a surface of said metal is coated with a polymer of the di- or monoacrylated alkoxyhalosilane represented by Formula I:

$$I[CH_2=CR^1C(O)O(CH_2)_nO]_pSi(R^2)_qX_m$$

wherein n is an integer between 3 and 10;
p is an integer 1 or 2;
q is an integer between 0 and 2;
m is an integer between 1 and 3;
with the proviso that p+q+m=4;
$R^1$ is H, C$_1$-C$_3$ alkyl;
$R^2$ is H, C$_1$-C$_6$ alkyl, cyclohexyl or C$_1$-C$_6$ alkoxy; and
X is halogen.

9. An anode according to claim 8 which is lithium.

10. An anode according to claim 8 wherein said polymer is a polymer of a monoacrylated alkoxyhalosilane.

11. An anode according to claim 8 wherein said polymer is a polymer of diacrylated alkoxyhalosilane.

12. An anode according to claim 8 wherein p=1, m is an integer 1 or 2, and X is chlorine.

13. An anode according to claim 12 wherein n is an integer between 2 and 4, m=1, $R^1$ is H or CH$_3$, and $R^2$ is C$_1$-C$_2$ alkyl.

14. An anode according to claim 8 coated with a polymer of monoacrylated alkoxychlorodimethylsilane.

15. An anode according to claim 8 coated with a polymer of diacrylated alkoxychloromethylsilane.

16. An anode according to claim 8 wherein said polymer has a molecular weight of from about 500 to about 100,000.

17. A solid electrochemical cell which comprises:
an anode containing lithium;
a cathode containing a compatible cathodic material;
interposed between said anode and said cathode, a solid electrolyte; and
interposed between said anode and said electrolyte, a polymeric layer comprising as prepolymer, the silane represented by Formula I $$[CH_2=CR^1C(O)O(CH_2)O]_pSi(R^2)_qX_m.$$

18. A solid electrochemical cell according to claim 17 wherein said silane is a di-acrylalkoxylated halosilane.

19. A solid electrochemical cell according to claim 18 wherein said silane is a di-acrylalkoxylated chlorosilane.

20. A solid electrochemical cell according to claim 17 wherein said silane is a di-acrylalkoxylated chloromethylsilane.

21. A solid electrochemical cell according to claim 17 wherein said silane is a monoacrylalkoxylated chlorodimethylsilane.

22. A method of making an anode for solid electrochemical cells comprising the steps of:

coating a lithium or lithium alloy metal surface with a polymer precursor composition comprising the silane represented by Formula I $$[CH_2=CR^1C(O)O(CH_2)O]_pSi(R^2)_qX_m;$$

and partially or totally curing said polymer precursor.

23. The method according to claim 22 wherein said curing step is carried out by exposing said polymer precursor composition to ultraviolet light or an electron beam.

24. A method of making a solid electrochemical cell comprising the steps of:
coating a compatible cathode composition comprising a radiation polymerizable polymer precursor onto a substrate;
coating an ionically conducting electrolyte composition comprising radiation polymerizable polymer precursors on to said cathode composition;
partially or totally curing said cathode composition and said electrolyte composition by exposing same to radiation;
coating a lithium, a lithium metal alloy, or a lithium coated foil metal surface with a second polymer precursor composition comprising the silane represented by Formula I $$[CH_2=CR^1C(O)O(CH_2)O]_pSi(R^2)_qX_m$$

partially or totally curing said second polymer precursor by exposing same to radiation to form a totally or partially cured polymeric layer on said lithium metal surface; and
placing said partially or totally cured polymeric layer on said lithium surface in operational contact with said partially or totally cured electrolyte composition.

25. The method according to claim 24 wherein said radiation is an electron beam.

26. A battery comprising a plurality of electrochemical cells of claim 17.

27. A method of passivating a lithium or lithium alloy metal surface comprises treating said surface with a composition of polymer precursors comprising the silane represented by Formula I $$[CH_2=CR^1C(O)O(CH_2)O]_pSi(R^2)_qX_m$$

and curing said polymer precursors to form an ultrathin polymeric layer of submicron thickness.

* * * * *